(12) United States Patent
Porras et al.

(10) Patent No.: US 11,718,148 B2
(45) Date of Patent: Aug. 8, 2023

(54) ELECTRIFIED VEHICLE REFRIGERANT SYSTEM

(71) Applicant: Ford Global Technologies, LLC, Dearborn, MI (US)

(72) Inventors: Angel Fernando Porras, Dearborn, MI (US); Timothy Noah Blatchley, Dearborn, MI (US); Brett Allen Dunn, Plymouth, MI (US); Rohan Shrivastava, Livonia, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 1151 days.

(21) Appl. No.: 15/877,487

(22) Filed: Jan. 23, 2018

(65) Prior Publication Data
US 2019/0225047 A1    Jul. 25, 2019

(51) Int. Cl.
| | |
|---|---|
| B60H 1/00 | (2006.01) |
| F25B 9/00 | (2006.01) |
| F25B 5/02 | (2006.01) |
| F25B 49/02 | (2006.01) |
| F25B 31/00 | (2006.01) |
| F25B 25/00 | (2006.01) |

(52) U.S. Cl.
CPC ..... *B60H 1/00392* (2013.01); *B60H 1/00271* (2013.01); *F25B 5/02* (2013.01); *F25B 9/006* (2013.01); *F25B 31/004* (2013.01); *F25B 49/02* (2013.01); *F25B 25/005* (2013.01); *F25B 2600/01* (2013.01); *F25B 2600/02* (2013.01); *F25B 2600/0251* (2013.01); *F25B 2700/1931* (2013.01)

(58) Field of Classification Search
CPC .......... B60H 1/00; B60H 1/22; B60H 1/3227; F25B 39/04
USPC ...................... 62/193, 200, 228.1, 228.3, 231
See application file for complete search history.

(56) References Cited

U.S. PATENT DOCUMENTS

| | | | |
|---|---|---|---|
| 5,807,076 A | 9/1998 | Kawaguchi et al. | |
| 5,970,727 A | 10/1999 | Hiraoka et al. | |
| 6,266,967 B1* | 7/2001 | Honda .................. | F25B 49/022 62/193 |
| 7,370,487 B2 | 5/2008 | Hayashi | |
| 7,854,137 B2 | 12/2010 | Lifson et al. | |
| 9,242,527 B2* | 1/2016 | Graaf ........................ | F25B 5/02 |

(Continued)

*Primary Examiner* — Jianying C Atkisson
*Assistant Examiner* — Meraj A Shaikh
(74) *Attorney, Agent, or Firm* — David B Kelley; Brooks Kushman P.C.

(57) ABSTRACT

A thermal system for an electrified vehicle including a thermal loop and a controller is provided. The thermal loop may include a rear evaporator and a compressor fluidly connected thereto, a conduit to distribute oil throughout the thermal loop, and an evaporator valve. The controller may be programmed to, responsive to receipt of a signal indicating evaporator valve shut-off and detection of a vehicle plug-in event, cycle the compressor to promote oil movement through the compressor. The controller may be further programmed to, responsive to receipt of the signal, open the evaporator valve to force oil back to the compressor. The thermal loop may further include a first expansion valve up stream of a chiller fluidly connected to the compressor, a second expansion valve between the evaporator valve and the rear evaporator, and a third expansion valve up stream of a front evaporator fluidly connected to the compressor.

18 Claims, 3 Drawing Sheets

(56) References Cited

U.S. PATENT DOCUMENTS

| | | | |
|---|---|---|---|
| 10,302,346 B2* | 5/2019 | Ragazzi | F25B 30/02 |
| 2004/0129007 A1* | 7/2004 | Tomita | B60H 1/00864 |
| | | | 62/157 |
| 2012/0023982 A1* | 2/2012 | Berson | F24F 5/0046 |
| | | | 62/115 |
| 2015/0217623 A1* | 8/2015 | Hatakeyama | B60L 1/02 |
| | | | 429/62 |
| 2016/0273816 A1* | 9/2016 | Horiuchi | F25B 13/00 |
| 2016/0273817 A1* | 9/2016 | Makino | F28F 1/22 |
| 2019/0070924 A1* | 3/2019 | Mancini | B60H 1/00564 |

\* cited by examiner

ELECTRIFIED VEHICLE REFRIGERANT SYSTEM

TECHNICAL FIELD

The present disclosure relates to a refrigerant system for an electrified vehicle.

BACKGROUND

Refrigerant systems of electrified vehicles may include multiple evaporators requiring a strategy to prevent oil from becoming trapped in the refrigerant lines and heat exchangers. Oil needs to be returned to the compressor to allow for lubrication of the compressor. Inclusion of A/C system shut-off valves may lead to oil accumulation in the refrigerant line and a starving of a compressor oil reservoir. Current control strategies to prevent oil entrapment include cycling the compressor between on and off states based on compressor operating time and evaporator usage. However, cycling the compressor while cooling a vehicle cabin may cause customer discomfort due to an increase in discharge air temperature.

SUMMARY

A thermal system for an electrified vehicle includes a thermal loop and a controller. The thermal loop may include a rear evaporator and a compressor fluidly connected thereto, a conduit to distribute oil throughout the thermal loop, and an evaporator valve. The controller is programmed to, responsive to receipt of a signal indicating evaporator valve shut-off and detection of a vehicle plug-in event, cycle the compressor to promote oil movement through the thermal loop and back to the compressor. The controller may be further programmed to, responsive to receipt of the signal, open the evaporator valve to force oil back to the compressor. The thermal loop may further include a first expansion valve up stream of a chiller fluidly connected to the compressor, a second expansion valve between the evaporator valve and the rear evaporator, and a third expansion valve between the evaporator and the evaporator valve and fluidly connected to the compressor. The expansion valves may be arranged with the evaporator valve such that the cycling or the compressor adjusts refrigerant pressure at the expansion valves to further promote oil movement within the thermal loop. The controller may be further programmed to cycle the compressor at expiration of a predetermined time-period from a vehicle start event. The predetermined time-period may be a length of time in which vehicle operation generates oil accumulation at the rear evaporator. The thermal loop may further include a front evaporator and a front evaporator valve and a chiller and a chiller valve. The controller may be further programmed to cycle the compressor at an expiration of a predetermined time-period from a detected closure of the front evaporator valve or the chiller valve. The controller may be further programmed to cycle the compressor at an expiration of a predetermined time-period from a detected closure of the evaporator valve. The controller may be further programmed to activate a cooling fan in communication with the thermal loop in response to detection of a compressor pressure value being outside of a predetermined threshold. The controller may be further programmed to cycle the compressor prior to a predetermined next usage time or at an end of a charge event if no next usage time is identified.

A refrigerant system for an electrified vehicle includes a thermal loop and a controller. The thermal loop includes a rear evaporator and a compressor fluidly connected thereto, a conduit to distribute oil throughout the thermal loop, and an evaporator valve to manage refrigerant and oil flow to the rear evaporator. The controller is programmed to, responsive to receipt of a signal indicating oil accumulation over a predetermined threshold at the rear evaporator and detection of a remote start event, cycle the compressor to reduce the oil accumulation at the rear evaporator and to promote oil movement through the conduit. The controller may be further programmed to cycle the compressor upon detection of an expiration of a time-period from detection of a vehicle start. The controller may be further programmed to cycle the compressor only upon receipt of the signal indicating oil over a predetermined threshold at the rear evaporator and only upon receipt of one or more signals indicating absence of vehicle occupants. The rear evaporator may be located upstream of the compressor, and the controller may be further programmed to cycle the compressor in response to receiving a signal indicating the evaporator valve is closed. The controller may be further programmed to activate a cooling fan in communication with the thermal loop in response to detection of a compressor pressure value being outside of a predetermined threshold. The controller may be further programmed to cycle the compressor between at least two speeds while activating one or more refrigerant valves at a preselected frequency to induce a delta pressure across expansion devices and the compressor of the system. The thermal loop may further include a front evaporator and a front evaporator valve and a chiller and a chiller valve. The controller may be further programmed to cycle the compressor at an expiration of a predetermined time-period from a detected closure of the rear evaporator valve, the front evaporator valve, or the chiller valve.

A refrigerant thermal system for an electrified vehicle includes a first thermal loop, a second thermal loop, a chiller, and a controller. The first thermal loop may include a high voltage battery and a first conduit to distribute coolant. The second thermal loop includes more than one evaporator, a compressor and a second conduit to distribute refrigerant and oil. The chiller thermally couples the first and second thermal loops. The controller directs operation of the thermal loops and is programmed to, responsive to at least one of the more than one evaporators being off and absence of vehicle occupants, cycle a compressor to promote oil movement within the second thermal loop. The controller may be further programmed to, responsive to detection of one of a remote start event and a plug-in event, cycle the compressor to promote oil movement within the second thermal loop. The system may further include a rear evaporator valve. The more than one evaporator may be a rear evaporator in fluid communication with the rear evaporator valve. The controller may be further programmed to cycle the compressor at an expiration of a predetermined time-period from detection of a closure of the rear evaporator valve. The controller may be further programmed to activate a cooling fan in communication with the second thermal loop in response to detection of a compressor pressure value being outside of a predetermined threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
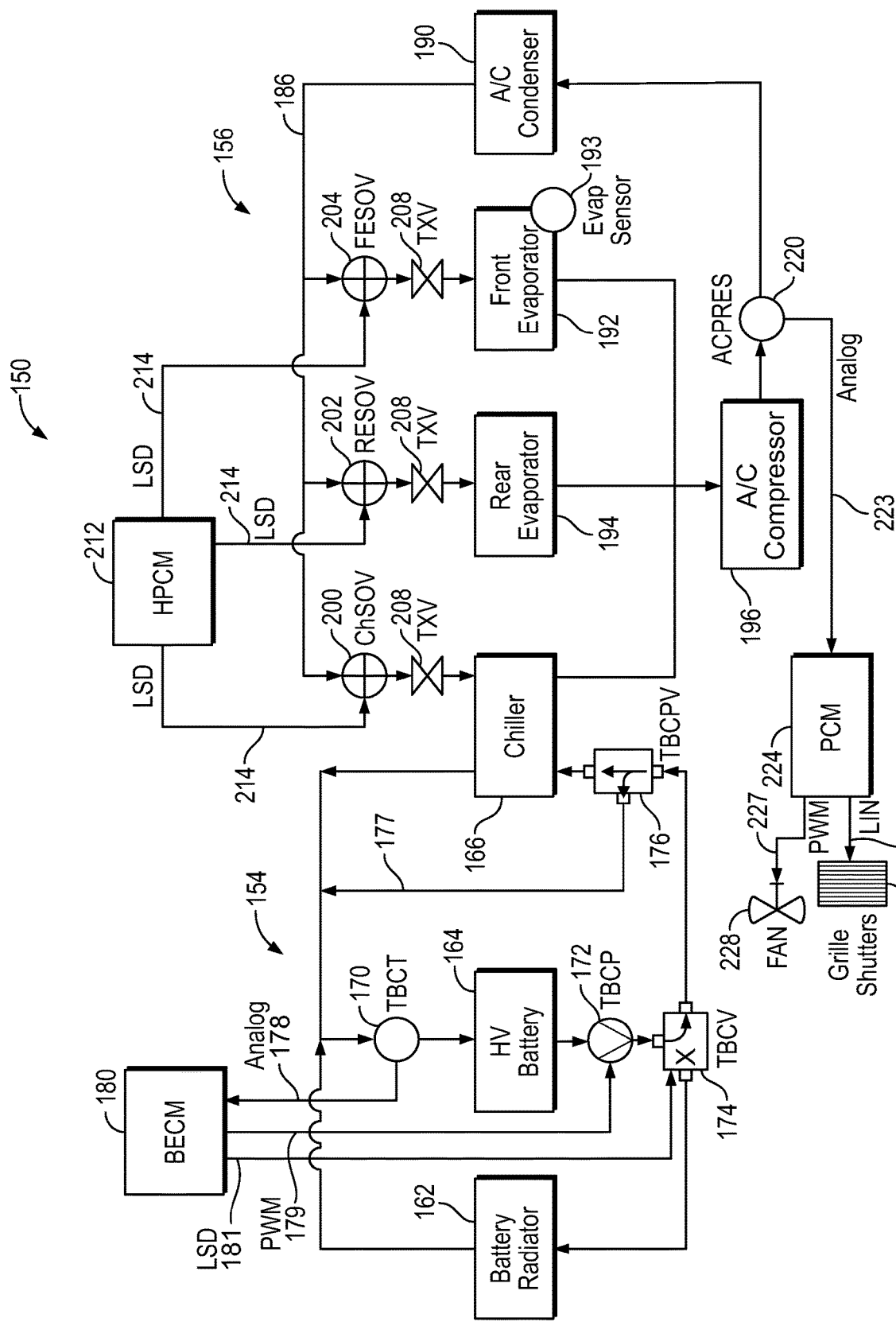
FIG. 1 is a schematic diagram illustrating an example of a refrigerant thermal system for a vehicle.

FIG. 1 is a schematic diagram illustrating an example of a refrigerant thermal system for an electrified vehicle. A refrigerant thermal system 150 may include a first thermal loop 154 and a second thermal loop 156. A first conduit 158 distributes coolant throughout the first thermal loop 154. For example, the first conduit 158 distributes coolant between a battery radiator 162, a high voltage battery 164, and a chiller 166. Valves are located within the first thermal loop 154 to assist in distributing the coolant. A traction battery coolant sensor (TBCT) 170 operates to monitor thermal conditions of coolant entering the high voltage battery 164. A traction battery coolant pump (TBCP) 172 operates to direct movement of coolant. A traction battery coolant valve (TBCV) 174 may be a two-way valve to selectively direct coolant to the battery radiator 162 and/or the chiller 166. A traction battery coolant proportional valve (TBCPV) 176 may operate to control a capacity of the chiller 166 by selectively directing coolant flow into the chiller 166 or directing the coolant into a chiller bypass conduit 177. The chiller 166 may operate based on a temperature of the high voltage battery 164 to assist in managing thermal conditions thereof. A battery electronics control module (BECM) 180 is in communication with components of the refrigerant thermal system 150 to monitor conditions and to direct operation thereof. For example, the BECM 180 is in communication with the TBCT sensor 170, the TBCP 172, and the TBCV 174.

The BECM 180 may operate the components of the refrigerant thermal system 150 to control distribution of coolant throughout the first thermal loop 154 based on preprogrammed instructions triggered upon receipt of component status signals and/or user input. For example, the BECM 180 may be in communication with the TBCT sensor 170 via an analog line 178 to receive signals from the TBCT sensor 170 relating to thermal conditions of the high voltage battery 164. The BECM 180 may be in communication with the TBCP 172 via a pulse width modification (PWM) line 179 to send operation signals to the TBCP 172. The BECM 180 may be in communication with the TBCV 174 via a low side driver (LSD) line 181 to send operation signals to the TBCV 174.

A second conduit 186 distributes refrigerant throughout the second thermal loop 156. For example, the second conduit 186 distributes refrigerant between an A/C condenser 190, a front evaporator 192, a rear evaporator 194, an A/C compressor 196, and the chiller 166. The front evaporator 192 and the rear evaporator 194 may assist in managing thermal conditions of a vehicle cabin for passenger comfort. An evaporator sensor 193 may monitor temperature and pressure conditions of refrigerant flowing through the front evaporator 192. Valves are located within the second thermal loop 156 to assist in distributing the refrigerant. Each of a chiller shut-off valve (ChSOV) 200, a rear evaporator shut-off valve (RESOV) 202, and a front evaporator shut-off valve (FESOV) 204 operate separately with one of a plurality of thermal expansion devices to selectively direct refrigerant therethrough. In one example, the thermal expansion devices may be fixed area expansion devices. In another example, the thermal expansion devices may be thermal expansion valves (TXV) 208 to selectively direct the refrigerant therethrough. Each of the TXVs 208 may be a passive control device. A bulb may be included within each TXV 208 which directs the TXV 208 to open or close based on a pressure and a temperature of the refrigerant. For example, each of the TXVs 208 may selectively open when a temperature or pressure of the refrigerant is detected to be within or outside of a predetermined threshold. Further, each of the TXVs 208 may open at different sizes based on the detected temperature or pressure of the refrigerant.

A hybrid powertrain control module (HPCM) 212 is in communication with the ChSOV 200, the RESOV 202, and the FESOV 204 via one of a plurality of electrical control lines 214, such as an LSD line, to direct operation thereof. For example, the HPCM 212 may be programmed to distribute the refrigerant throughout the second thermal loop 156 upon receipt of a signal indicating presence of a trigger condition and/or user input. For example, a user may manually input activation or deactivation commands for the rear evaporator 194 or the front evaporator 192. The HPCM 212 may also be in communication with multiple controllers for battery and engine controls including the BECM 180. All of the controllers may be in communication with a power distribution box (not shown) to direct operation thereof.

An A/C pressure sensor (ACPRES) 220 monitors a pressure of refrigerant traveling from the A/C compressor 196 to the A/C condenser 190. The ACPRES 220 sends a signal to a powertrain control module (PCM) 224 when a refrigerant pressure is detected as being within or outside of a predetermined threshold to limit the speed of the A/C compressor 196 to maintain safe operating conditions. When refrigerant pressure is detected as being within/outside the predetermine threshold, a signal may be sent from the ACPRES 220 to the PCM 224 via an analog line 223. Upon receipt of the signal from the ACPRES 220, the PCM 224 may send operational signals to grille shutters 226 and a cooling fan 228 via an electrical control line 225, such as a LIN line, or an electrical control line 227, such as a PWM line, respectively.

The chiller 166 selectively links the first thermal loop 154 and the second thermal loop 156. For example, heat may be transferred between the coolant of the first thermal loop 154 and the refrigerant of the second thermal loop 156 via the chiller 166 based on a detected temperature of the coolant and/or the refrigerant. Depending on the detected temperatures, the coolant or refrigerant may be run through the chiller 166 to maintain an operating temperature in a respective optimal range.

The BECM 180, the HPCM 212, and the PCM 224 may operate with one another in conjunction with the a power distribution box to prevent oil entrapment within the refrigerant thermal system 150 by executing an oil entrapment prevention strategy. Previous oil entrapment prevention strategies for combustion engine vehicles with belt drive compressors do not directly translate to operation within electrified vehicles. The previous oil entrapment prevention strategies operated with air-cooled systems requiring different components than those needed for a liquid-cooled system. The refrigerant thermal system 150 may execute the oil entrapment prevention strategy to cycle operation of the A/C compressor 196 to promote oil flow throughout the second conduit 186 and minimize or prevent oil accumulation at the rear evaporator 194 or the chiller 166. For example, the A/C compressor 196 may be cycled between at least two speeds while activating one or more refrigerant valves at a preselected frequency to induce a delta pressure across the A/C compressor 196 and expansion devices the refrigerant thermal system 150. In another example, the oil entrapment prevention strategy may operate to prevent or minimize collection of the oil at one or more of the TXVs 208. By cycling the A/C compressor 196 off and on, a pressure of the refrigerant may be changed enough to drive one or more of the TXVs to open or close.

The oil entrapment prevention strategy may be operated in a manner to minimally impact passenger satisfaction. For example, evaporative capacity of an HVAC system including the compressor 196 may be degraded when the oil entrapment prevention strategy runs due to the compressor 196 cycling off and on as well as refrigerant flow being diverted to all evaporators. The degradation of evaporative capacity may increase evaporator discharge temperatures which negatively affect climate conditions for passengers within the vehicle cabin.

In one example, oil is distributed throughout the second thermal circuit 156 to assist with operation thereof. If a rear climate control system is not running and the shut off valve is closed, oil may accumulate where the oil path is closed and thus an optimal amount of oil is not reaching the A/C compressor 196. In addition to the oil accumulation, the A/C compressor 196 may be potentially damaged when the oil is not received. A control strategy may be initiated to prevent the oil accumulation. It should be noted that the A/C compressor 196 may include an oil reservoir to provide oil to the A/C compressor for certain amounts of time and preferably such that the control strategy is not run unless the vehicle is driven a predetermined amount of time, such as one hour or more.

Figure 2:
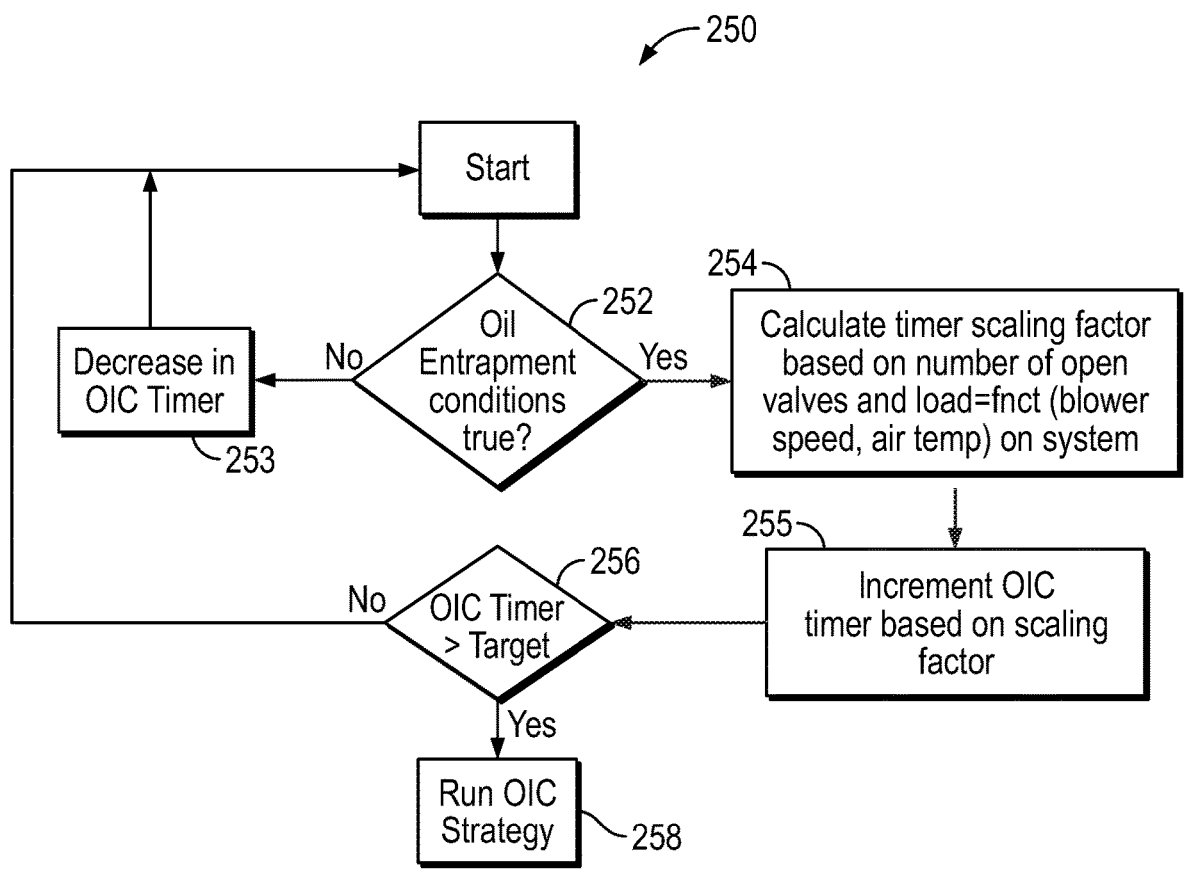
FIG. 2 is a flow chart illustrating an example of a control strategy for a refrigerant thermal system of a vehicle.

FIG. 2 illustrates an example of a control strategy for a refrigerant thermal system of a vehicle, such as the refrigerant thermal system 150. A control strategy 250 may operate to identify whether to initiate an oil entrapment prevention (OEP) strategy to prevent oil entrapment within refrigerant lines and evaporators of the refrigerant thermal system. In operation 252, one or more sensors may detect whether an oil entrapment condition is present. For example, the one or more sensors, such as one or more sensors of the refrigerant thermal system 150 described above, may detect oil accumulation and send a detection signal to a controller, such as the HPCM 212. The controller may then communicate with an oil in circulation (OIC) timer. In another example, predetermined conditions may be detected to trigger activation of the OIC timer. Examples of the predetermined conditions include system operation with some of the shut-off valves closed or an operation of evaporators under low load conditions. A low load condition may be defined as minimal air flow or coolant flow across the heat exchanger and that the evaporator or chiller does not have to cool that air or coolant very much. When this happens the TXV opens minimally and oil may be trapped due to lower refrigerant flow rates.

In the event an oil entrapment condition is not identified as present in operation 252, the OIC timer may be decreased in operation 253. In the event an oil entrapment condition is identified in operation 252, a timing scaling factor may be calculated in operation 254. For example, the scaling factor may be based on blower speed or air temperature. In operation 255, the OIC timer may be incremented based on the scaling factor.

In the event the OIC timer accumulates a time value greater than a predetermined threshold in operation 256, the controller may initiate the oil entrapment prevention strategy in operation 258. In the event the OIC timer does not accumulate a time value greater than the predetermined threshold, the controller may return to a start of the control strategy 250.

Figure 3:
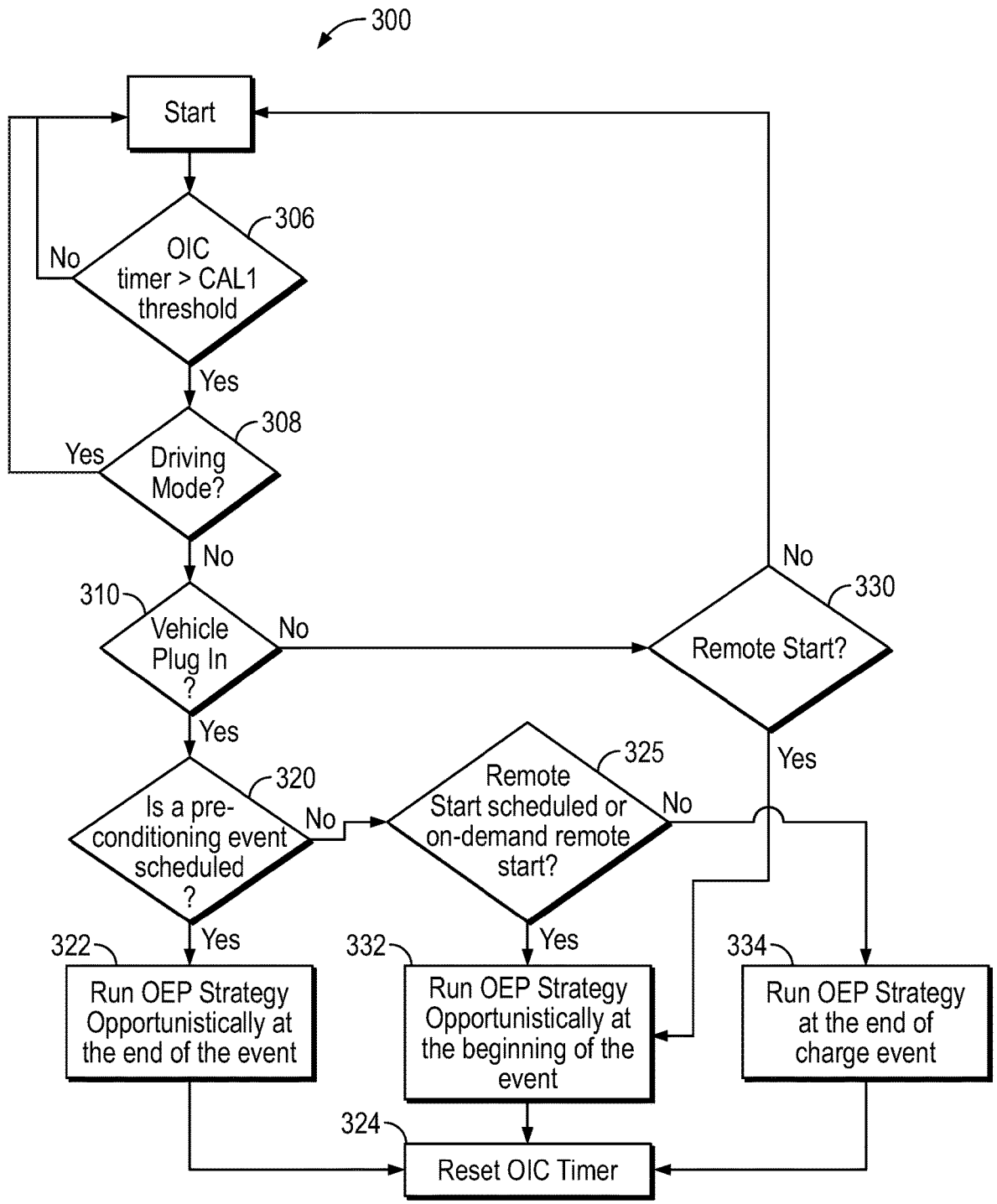
FIG. 3 is a flow chart illustrating another example of a control strategy for a refrigerant thermal system of a vehicle.

FIG. 3 illustrates another example of a control strategy for a refrigerant thermal system of a vehicle, such as the refrigerant thermal system 150. A control strategy 300 may operate to initiate one or more OEP strategies based on a detected status of one or more of the components of the refrigerant thermal system. The control strategy 300 may operate to mitigate how often an oil entrapment strategy is run while a passenger is in the vehicle to improve passenger experience. For example, the control strategy 300 may operate when detection indicates a passenger is not in the vehicle, when detection indicates the vehicle is plugged in for a charging event, or when a remote start even is detected.

In operation 306, a controller may detect whether an OIC timer has accumulated to a value greater than a first calibratable threshold. In the event the calibratable threshold has not been reached, the controller may return to the start of the control strategy 300. In the event the OIC timer has accumulated to a time value greater than the calibratable threshold, the controller may than identify whether the vehicle is in a drive mode in operation 308. In the event the vehicle is in a drive mode, the controller may return to the start of the control strategy 300.

In the event the vehicle is not in a drive mode, the controller may identify whether the vehicle is in a plug-in mode for charging in operation 310. In the event the controller identifies the vehicle being in a plug-in mode, the controller may identify whether a preconditioning event or a drive conditioning event is scheduled in operation 320. In one example, a preconditioning event may relate to a passenger setting a next usage time (NUT) or the vehicle identifies when the passenger will be using the vehicle next. Upon identification, the vehicle may activate climate control a predetermined amount of time prior to a desired passenger departure so the vehicle cabin is thermally comfortable when the passenger is ready to depart. This activation may also reduce an amount of energy needed to maintain the vehicle cabin as thermally comfortable while the vehicle is driving. In another example, the preconditioning event may relate to a triggering of vehicle settings to operate at modes selected prior to a remote start event. In another example, a preconditioning event may relate to a triggering of a thermal management system to cool a high voltage battery in response to detection of a vehicle high voltage battery temperature being above a predetermined threshold.

An example of a drive conditioning event may include detection of a known NUT or detection of the high voltage battery being outside of a predetermined threshold. In this example, the controller may trigger heating or cooling of the high voltage battery to a predetermined temperature. At the end of the preconditioning event or the drive-conditioning event, the controller may initiate an OEP strategy opportunistically in operation 322.

The OIC timer may then be reset in operation 324 and the controller may return to the start of the control strategy 300. This reduces the likelihood that the passenger will observe or notice an OEP event while driving the vehicle and therefor reduce a likelihood of changes in discharge air temperature due to an OEP event.

In the event the controller identifies that the vehicle is not in a plug-in mode in operation 310, the controller may identify whether a remote start is detected in operation 330. If a remote start event is not detected in operation 330, the controller may return to the start of the control strategy 300. If a remote start is detected in operation 330, the controller may activate the OEP strategy to run opportunistically.

If a preconditioning event is not identified in operation 320, the controller may then identify whether a remote start event is scheduled or whether an on-demand remote start is detected in operation 325. If a remote start is scheduled or an on-demand remote start is detected in operation 325, the controller may direct the OEP strategy to run opportunistically at the beginning of the remote start event in operation 332.

If either a remote start event is not identified as scheduled or an on-demand remote start is not detected in operation 325, the controller may activate the OEP strategy at an end of the charge even.

The OEP strategy may also be initiated based upon detection of an expiration of a time-period beginning at a vehicle start or begin at a detection of an evaporator valve closure. For example, the compressor may be cycled to promote a flow of oil after a certain time-period has expired from a vehicle start. In this example, the time-period may be based on historical vehicle operation to identify a time-period in which oil accumulation negatively impacts performance of the evaporator or compressor. In another example, the compressor may be cycled to promote a flow of oil after a time-period has expired relating to closure of an evaporator valve. In this example, the time-period may be based on historical vehicle operation to identify a time-period in which oil accumulates at an unacceptable level due to closure of the evaporator valve.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A thermal system for an electrified vehicle comprising:
   a thermal loop including a rear evaporator and a compressor fluidly connected thereto, a conduit to distribute oil throughout the thermal loop, and an evaporator valve; and
   a controller programmed to,
      responsive to receipt of a signal indicating evaporator valve shut-off and detection of the vehicle being plugged in while parked, cycle the compressor to promote oil movement through the thermal loop and back to the compressor, and
      time cycling of the compressor while the vehicle is plugged in based on presence of a scheduled remote start such that the cycling occurs earlier while the vehicle is plugged responsive to the presence of the scheduled remote start than the cycling occurs responsive to absence of the scheduled remote start in circumstances which the scheduled remote start occurs before an end of charging while the vehicle is plugged in.

2. The system of claim 1, wherein the controller is further programmed to, responsive to receipt of the signal, open the evaporator valve to force oil back to the compressor.

3. The system of claim 2, wherein the thermal loop further comprises a first expansion valve between the rear evaporator and the evaporator valve and fluidly connected to the compressor, a second expansion valve between the evaporator valve and the rear evaporator, and a third expansion valve up stream of a front evaporator fluidly connected to the compressor, and wherein the expansion valves are arranged with the evaporator valve such that the cycling of the compressor adjusts refrigerant pressure at the expansion valves to further promote oil movement within the thermal loop.

4. The system of claim 1, wherein the controller is further programmed to cycle the compressor at expiration of a predetermined time-period from a vehicle start event, and wherein the predetermined time-period is a length of time in which vehicle operation generates oil accumulation at the rear evaporator.

5. The system of claim 4, wherein the controller is further programmed to cycle the compressor at an expiration of a predetermined time-period from a detected closure of the evaporator valve.

6. The system of claim 4, wherein the thermal loop further comprises a front evaporator and a front evaporator valve, a chiller and a chiller valve, and wherein the controller is further programmed to cycle the compressor at an expiration of a predetermined time-period from a detected closure of the front evaporator valve or the chiller valve.

7. A refrigerant system for an electrified vehicle comprising:
   a thermal loop including a rear evaporator and a compressor fluidly connected thereto, a conduit to distribute oil throughout the thermal loop, and a rear evaporator valve to manage refrigerant and oil flow to the rear evaporator; and
   a controller programmed to,
      responsive to receipt of a signal indicating the electrified vehicle is plugged in while parked, cycle the compressor to reduce the oil accumulation at the rear evaporator and to promote oil movement through the conduit, and
      time cycling of the compressor while the vehicle is plugged in based on presence of a scheduled remote start such that the cycling occurs earlier while the vehicle is plugged in responsive to the presence of the scheduled remote start than the cycling occurs responsive to absence of the scheduled remote start in circumstances which the scheduled remote start occurs before an end of charging while the vehicle is plugged in.

8. The system of claim 7, wherein the controller is further programmed to cycle the compressor upon detection of an expiration of a time-period from detection of a vehicle start.

9. The system of claim 7, wherein the controller is further programmed to cycle the compressor only upon receipt of the signal indicating oil over a predetermined threshold at the rear evaporator and only upon receipt of one or more signals indicating absence of vehicle occupants.

10. The system of claim 7, wherein the rear evaporator is located upstream of the compressor, and wherein the controller is further programmed to cycle the compressor in response to receiving a signal indicating the evaporator valve is closed.

11. The system of claim 7, wherein the controller is further programmed to activate a cooling fan in communication with the thermal loop in response to detection of a compressor pressure value being outside of a predetermined threshold.

12. The system of claim 7, wherein the controller is further programmed to cycle the compressor between at least two speeds while activating one or more refrigerant valves at a preselected frequency to induce a delta pressure across expansion devices and the compressor of the system.

13. The system of claim 7, wherein the thermal loop further comprises a front evaporator and a front evaporator valve, a chiller and a chiller valve, and wherein the controller is further programmed to cycle the compressor at an expiration of a predetermined time-period from a detected closure of the rear evaporator valve, the front evaporator valve, or the chiller valve.

14. A refrigerant thermal system for an electrified vehicle comprising:
   a first thermal loop including a high voltage battery and a first conduit to distribute coolant;
   a second thermal loop including an evaporator, a compressor and a second conduit to distribute refrigerant and oil;
   a chiller to thermally couple the first and second thermal loops; and
   a controller to direct operation of the thermal loops and programmed to,
      responsive to the evaporator being off, absence of vehicle occupants, and the vehicle being plugged in, cycle a compressor to promote oil movement within the second thermal loop; and
      time cycling of the compressor while the vehicle is plugged in based on presence of a scheduled remote start such that the cycling occurs earlier while the vehicle is plugged in responsive to the presence of the scheduled remote start than the cycling occurs responsive to absence of the scheduled remote start in circumstances which the scheduled remote start occurs before an end of charging while the vehicle is plugged in.

15. The system of claim 14, wherein the controller is further programmed to, responsive to detection of a remote start event, cycle the compressor to promote oil movement within the second thermal loop.

16. The system of claim 14 further comprising a rear evaporator valve, wherein the one evaporator is a rear evaporator in fluid communication with the rear evaporator valve, and wherein the controller is further programmed to cycle the compressor at an expiration of a predetermined time-period from detection of a closure of the rear evaporator valve.

17. The system of claim 14, wherein the controller is further programmed to activate a cooling fan and grille shutters in communication with the second thermal loop in response to detection of a compressor pressure value being outside of a predetermined threshold.

18. The system of claim 7, wherein the controller is further programmed to responsive to a detection of a plug-in event, cycle the compressor at the end of the plug-in event when a vehicle battery cooling is no longer needed.

* * * * *